2,793,224

P-CHLOROPHENYL-MERCAPTOMETHYL DI-ALKYL DITHIOPHOSPHATES AND THEIR USE AS INSECTICIDES

Llewellyn W. Fancher, Concord, Calif., assignor to Stauffer Chemical Company, a corporation of Delaware No Drawing. Application February 3, 1954, Serial No. 408,025

12 Claims. (Cl. 260—461)

This invention relates to certain new compositions of matter, the method of making the compositions and the use of the compositions as insecticides and acaracides.

The compounds of the present invention have the general structural formula:

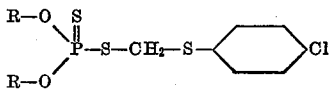

In the above formula, R represents identical lower alkyl radicals which are preferably ethyl or isopropyl radicals, but which may be methyl, propyl, butyl or pentyl radicals. The novel compounds of the present invention have a number of uses, and are particularly adapted for use as insecticides and acaracides. Surprisingly, the compounds are particularly outstanding when tested against mites from a phosphate resistant strain. Thus, despite the fact that the compounds of the present invention are phosphates, the substitutent radicals are apparently such that the compounds are effective acaracides against strains normally resistant to such compounds. Of course, the compounds are even more effective when tested against mites which have not become resistant to phosphate type compounds.

In one series of tests, the compounds of the present invention were made up in sprays and tested against the two-spotted mite from a phosphate-resistant strain. Since it was thought that the compounds would be comparable in action to well-known commercial acaracides and insecticides, comparison tests were also made with Parathion (p-nitrophenyldiethyl thionophosphate), Systox (O-O-diethyl-o-2(ethyl mercapto) ethyl thiophosphate), and Malathion (O,O-dimethyl phosphate of diethyl mercapto succinate). Two compounds of the present invention which were particularly effective were given code numbers as follows:

R-1246 for p-chlorophenylmercaptomethyl di-isopropyl dithiophosphate,
R-1303 for p-chlorophenylmercaptomethyl di-ethyl dithiophosphate.

In one test of the compounds, dispersions were prepared by adding five grams of the toxic material to sufficient acetone to make 100 milliliters of solution. This solution was then diluted with water containing 0.015% Vatsol (a sulfonate-type wetting agent) and 0.005% Methocel (methyl cellulose) as emulsifiers, the amount of water being sufficient to give concentrations of active ingredient ranging from 0.01 to 0.06%. Similar preparations were made containing Parathion, but Systox was used in the commercial form of a two-pound per gallon emulsible concentrate dispersed in tap water. All comparisons were made at the same concentrations of toxicant. The compositions were then sprayed on pinto bean plants, some of which had been infested with a phosphate-resistant strain of two-spoted mites (*Tetranychus bimaculatus*-Harvey), and others of which had been infested with a non-resistant strain of the two-spotted mite. After ten days, the plants were examined both for post-embryonic forms of the mite as well as eggs. The percentage of kill was determined by comparison with control plants which had not been sprayed. The following data were obtained:

TABLE I
*Phosphate resistant strain*

| Sample | Concentration, percent | Post Embryonic Kill, percent | Eggs-Kill, percent |
|---|---|---|---|
| R-1246 | .06 | 100 | 87 |
|  | .04 | 87 | 87 |
|  | .02 | 17 | 50 |
|  | .01 | 0 | 0 |
| R-1303 | .06 | 100 | 100 |
|  | .04 | 62 | 87 |
|  | .02 | 62 | 50 |
|  | .01 | 17 | 17 |
| Parathion | .06 | 0 | 0 |
|  | .04 | 0 | 0 |
|  | .02 | 0 | 0 |
|  | .01 | 0 | 0 |
| Systox | .06 | 50 | 17 |
|  | .045 | 17 | 17 |
|  | .03 | 17 | 17 |
|  | .015 | 0 | 0 |

TABLE II
*Non-resistant strain*

| Sample | Concentration, percent | Post Embryonic Kill, percent | Eggs-Kill, percent |
|---|---|---|---|
| R-1246 | .03 | 100 | 100 |
|  | .02 | 100 | 100 |
|  | .01 | 100 | 100 |
|  | .005 | 87 | 100 |
| R-1303 | .03 | 100 | 100 |
|  | .03 | 17 | 0 |
| Malathion | .02 | 17 | 0 |
|  | .01 | 17 | 0 |
|  | .005 | 17 | 0 |

In no case was it found that the compositions exerted phytotoxicity in the concentrations utilized.

Similar tests were made except the spray was applied to uninfested pinto bean plants and the plants were subsequently exposed to the two-spotted mite of the non-resistant strain. In this test, the following results were obtained:

TABLE III

| Sample | Concentration, percent | Post Embryonic Kill, percent | Eggs-Kill, percent |
|---|---|---|---|
| R-1246 | .03 | 100 | 100 |
|  | .01 | 100 | 100 |
| R-1303 | .03 | 100 | 100 |
|  | .01 | 100 | 100 |
| Malathion | .03 | 17 | 0 |
|  | .01 | 17 | 0 |

In another series of tests, small screen cages containing various species of inserts were sprayed with the active compound at a concentration of 0.5%. After twenty-four hours, a count was made to determine living and dead insects. The following results were obtained:

TABLE IV

| Sample | M. domestica | P. americana | O. fasciatus | T. confusum | A. fabae |
|---|---|---|---|---|---|
| R-1246 | 100 | 50 | 10 | 30 | 100 |
| R-1303 | 100 | 100 | 0 | 100 | 100 |

Pinto bean plants which were infested with *A. fabae* were sprayed with various concentrations of the compounds of the present invention. After twenty-four hours, the plants were examined and the following results obtained:

TABLE V

| Sample | Concentration, percent | Mortality, percent |
|---|---|---|
| R-1246 | .03 | 100 |
|  | .02 | 100 |
|  | .01 | 100 |
|  | .005 | 100 |
| R-1303 | .03 | 100 |
|  | .02 | 100 |
|  | .01 | 87 |
|  | .005 | 100 |
| Malathion | .03 | 100 |
|  | .02 | 100 |
|  | .01 | 100 |
|  | .005 | 100 |

When used as insecticides or acaracides, the compounds of the present invention are preferably compounded in the form of a dispersion for application. However, they may be applied as a solution in suitable solvents, such as acetone and the like, or can be mixed with inert dust and applied as a powder. One particularly advantageous manner of applying the compounds of the present invention is to make them into the form of a wettable powder by the addition of a finely ground carrier or diluent such as Attaclay, a finely divided clay, containing a suitable wetting agent such as Duponal 51, a higher aliphatic alcohol sulfate wetting agent. Such powders can be readily mixed with water and applied as dispersions to infested plants.

The compounds of the present invention can be made in the following manner:

R-1246—About 10.0 gms. (0.05 M) of p-chlorophenylchloromethyl sulfide, 15.0 gms. (0.06 M) of potassium diisopropyl-dithiophosphate and 100 ml. of 95% isopropanol, were refluxed two hours. The bulk of the alcohol was distilled off and the residue treated with 100 ml. of cold water and 100 ml. of 30–60° petroleum ether and the mixture transferred to a separatory funnel and shaken thoroughly. The lower aqueous layer was discarded and the petroleum ether layer washed several times with cold water, dried over anhydrous sodium carbonate, filtered and the petroleum ether distilled off on the steam bath. The product, a light yellow colored liquid, weighed 12.3 gms. (64.0% based on the p-chlorophenyl-chloromethyl sulfide). The $N_D^{25}=1.6200$.

R-1303—In an identical manner as the preceding, the ethyl analog was prepared. Thus, from 15.0 gms. (0.08 M) of p-chlorophenyl-chloromethyl sulfide, 25.8 gms. (0.12 M) of sodium-diethyl dithiophosphate and 150 ml. of 97% isopropanol there was obtained 15.8 gms. (59%) of light yellow colored liquid. The $N_D^{26}=1.6198$.

I claim:

1. As a new composition of matter a compound having the formula:

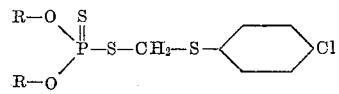

wherein R is a lower alkyl radical.

2. As a new composition of matter p-chlorophenylmercaptomethyl di-isopropyl dithiophosphate.

3. As a new composition of matter p-chlorophenylmercaptomethyl di-ethyl dithiophosphate.

4. The method of killing pests comprising applying to an insect habitat a composition containing as the essential active ingredient a compound having the formula:

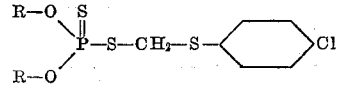

wherein R is a lower alkyl radical.

5. The method of killing pests comprising applying to a pest habitat a composition containing as an essential active ingredient p-chlorophenylmercaptomethyl di-isopropyl dithiophosphate.

6. The method of killing pests comprising applying to a pest habitat a composition containing as an essential active ingredient p-chlorophenylmercaptomethyl di-ethyl dithiophosphate.

7. As a new composition of matter an inert insecticidal adjuvant and a compound having the formula:

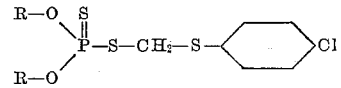

wherein R is a lower alkyl radical.

8. As a new composition of matter an inert insecticidal adjuvant and p-chlorophenylmercaptomethyl di-isopropyl dithiophosphate.

9. As a new composition of matter an inert insecticidal adjuvant and p-chlorophenylmercaptomethyl di-ethyl dithiophosphate.

10. A method of making a compound having the formula:

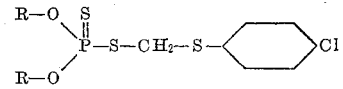

wherein R is a lower alkyl radical, comprising reacting p-chlorophenyl-chloromethyl sulfide with an alkali metal salt of a di-lower alkyl dithiophosphate.

11. The method of making p-chlorophenylmercaptomethyl di-isopropyl dithiophosphate comprising reacting p-chlorophenylchloromethyl sulfide with an alkali metal salt of a di-isopropyldithiophosphate.

12. The method of making p-chlorophenylmercaptomethyl di-ethyl dithiophosphate comprising reacting p-chlorophenylchloromethyl sulfide with an alkali metal salt of a dimethyldithiophosphate.

References Cited in the file of this patent

UNITED STATES PATENTS

| 2,520,393 | Fletcher | Aug. 29, 1950 |
| 2,565,920 | Hook et al. | Aug. 28, 1951 |
| 2,586,655 | Hook | Feb. 19, 1952 |
| 2,614,988 | Hook et al. | Oct. 21, 1952 |
| 2,680,132 | Schroder | June 1, 1954 |

OTHER REFERENCES

B. I. O. S. Report 714 PB 87923-R, p. 60 (1948).